(12) United States Patent
Zenno

(10) Patent No.: US 7,673,727 B2
(45) Date of Patent: Mar. 9, 2010

(54) AUTOMATIC SHIFT CONTROL DEVICE AND VEHICLE

(75) Inventor: Tooru Zenno, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 525 days.

(21) Appl. No.: 11/514,000

(22) Filed: Aug. 31, 2006

(65) Prior Publication Data

US 2007/0240955 A1  Oct. 18, 2007

(30) Foreign Application Priority Data

Apr. 18, 2006   (JP) .............................. 2006-114700

(51) Int. Cl.
- *B60K 17/02* (2006.01)
- *B60W 10/02* (2006.01)
- *B60W 10/10* (2006.01)

(52) U.S. Cl. ........................................ 192/3.56; 74/335

(58) Field of Classification Search ................ 192/3.55, 192/3.56, 3.63
See application file for complete search history.

(56) References Cited

U.S. PATENT DOCUMENTS

| 1,500,878 | A | 7/1924 | Kruchten |
| 5,121,649 | A | 6/1992 | Randriazanamparany et al. |
| H2031 | H | 6/2002 | Harrell et al. |
| 6,481,554 | B1 | 11/2002 | Ota |
| 6,502,681 | B1 | 1/2003 | Ota |
| 2004/0118652 | A1 | 6/2004 | Muetzel et al. |
| 2006/0011001 | A1* | 1/2006 | Showalter ....................... 74/23 |
| 2006/0094567 | A1 | 5/2006 | Kosugi et al. |
| 2006/0124422 | A1 | 6/2006 | Zenno |
| 2006/0128525 | A1 | 6/2006 | Zenno |
| 2006/0128527 | A1 | 6/2006 | Zenno et al. |
| 2006/0160660 | A1 | 7/2006 | Zenno et al. |
| 2006/0169561 | A1 | 8/2006 | Ooishi et al. |
| 2006/0169562 | A1 | 8/2006 | Kosugi |
| 2006/0169569 | A1 | 8/2006 | Ooishi et al. |

FOREIGN PATENT DOCUMENTS

| EP | 0129417 | 6/1984 |
| EP | 0328362 | 8/1989 |
| EP | 0590240 | 4/1994 |

(Continued)

OTHER PUBLICATIONS

Co-Pending U.S. Appl. No. 11/514,387, filed Aug. 31, 2006. Title: Clutch Failure Detector, Automatic Clutch System, and Straddle-Type Vehicle.

(Continued)

*Primary Examiner*—Rodney H Bonck
(74) *Attorney, Agent, or Firm*—Keating & Bennett, LLP

(57) ABSTRACT

In a clutch engaging and disengaging operation at the time of a shift change, a state in which the clutch position of the clutch is at a specific value between a first clutch position at which a half clutch state finishes and a second clutch position at which the clutch is in a mechanical maximum disengaged state is maintained until completion of a gear change is detected by a gear position sensor. Therefore, even if a dog abutment state occurs between first gears with engaging projections and second gears with engaging recesses, the dog abutment can be resolved properly.

11 Claims, 14 Drawing Sheets

FOREIGN PATENT DOCUMENTS

| | | |
|---|---|---|
| EP | 0635391 | 7/1994 |
| EP | 0887220 | 6/1998 |
| EP | 0987467 | 7/1999 |
| EP | 1342930 A2 | 3/2003 |
| EP | 1365176 | 5/2003 |
| EP | 1555461 | 10/2003 |
| EP | 1469236 | 4/2004 |
| EP | 1666772 | 8/2005 |
| GB | 2170571 | 1/1986 |
| JP | 58-152938 | 9/1983 |
| JP | 61-024858 | 2/1986 |
| JP | 62-017631 | 1/1987 |
| JP | 62-110532 | 5/1987 |
| JP | 02-118269 | 5/1990 |
| JP | 03-172675 | 7/1991 |
| JP | 03-290030 | 12/1991 |
| JP | 4-266619 | 9/1992 |
| JP | 05-026065 | 2/1993 |
| JP | 05-039865 | 2/1993 |
| JP | 08-061487 | 3/1996 |
| JP | 11-082710 | 3/1999 |
| JP | 3044498 | 3/2000 |
| JP | 2000-205411 | 7/2000 |
| JP | 2001-050389 | 2/2001 |
| JP | 2001-146930 | 5/2001 |
| JP | 2001-173685 | 6/2001 |
| JP | 2001-280493 | 10/2001 |
| JP | 2002-067741 | 3/2002 |
| JP | 2002-243034 | 8/2002 |
| JP | 2003-329064 | 11/2003 |
| JP | 2005-282784 | 10/2005 |
| JP | 2006-017221 | 1/2006 |
| WO | WO 91/10979 | 7/1991 |
| WO | WO 98/24008 | 6/1998 |
| WO | WO 02/25131 | 3/2002 |
| WO | WO 2004/005743 | 1/2004 |
| WO | WO 2004/094177 | 11/2004 |

OTHER PUBLICATIONS

Co-Pending U.S. Appl. No. 11/514,386, filed Aug. 31, 2006. Title: Clutch Control Device and Vehicle.
Co-Pending U.S. Appl. No. 11/513,609, filed Aug. 31, 2006. Title: Automated Transmission Controller and Vehicle Including the Automated Transmission Controller.
Co-Pending U.S. Appl. No. 11/514,017, filed Aug. 31, 2006. Title: Automated Transmission Controller and Vehicle Including the Automated Transmission Controller.
Co-Pending U.S. Appl. No. 11/513,537, filed Aug. 31, 2006. Title: Automatic Gearshift Control Device and Vehicle.
Co-Pending U.S. Appl. No. 11/469,268, filed Aug. 31, 2006. Title: Clutch Actuator, Engine Unit, and Straddle Type Vehicle.
Co-Pending U.S. Appl. No. 11/469,310, filed Aug. 31, 2006. Title: Clutch Actuator, Engine Unit, and Straddle Type Vehicle.
Co-Pending U.S. Appl. No. 11/469,228, filed Aug. 31, 2006. Title: Clutch Actuator, Engine Unit, and Straddle Type Vehicle.
Co-Pending U.S. Appl. No. 11/469,252, filed Aug. 31, 2006. Title: Shift Actuator, Vehicle and Method of Integrating Vehicle.
Co-Pending U.S. Appl. No. 10/591,285, filed Aug. 31, 2006. Title: Riding Type Vehicle.
Co-Pending U.S. Appl. No. 10/591,560, filed Aug. 31, 2006. Title: Speed Change Controller for Straddle-Ride Type Vehicles.
Co-Pending U.S. Appl. No. 10/591,559, filed Aug. 31, 2006. Title: Shift Control Device for Straddle-Type Vehicle, and Straddle-Type Vehicle.
Co-Pending U.S. Appl. No. 10/591,284, filed Aug. 31, 2006. Title: Actuation Force Transmission Mechanism and Straddle-Type Vehicle.
EPO European Search Report for EP 06025982, completed Feb. 6, 2007.
EPO European Search Report for EP 06025981, completed Feb. 16, 2007.
EPO European Search Report for EP 06025877, completed Feb. 12, 2007.
EPO European Search Report for EP 06025734, completed Feb. 8, 2007.
EPO European Search Report for EP 06025732, completed Feb. 9, 2007.
EPO European Search Report for EP 06025609, completed Feb. 5, 2007.
EPO European Search Report for EP 06025607, completed Feb. 5, 2007.
EPO European Search Report for EP 06025606, completed Feb. 5, 2007.

* cited by examiner

AUTOMATIC SHIFT CONTROL DEVICE AND VEHICLE

CROSS-REFERENCE TO RELATED APPLICATIONS

This application claims the priority benefit of Japanese Patent Application No. 2006-114700, which was filed on Apr. 18, 2006 and which is hereby incorporated by reference in it's entirety.

BACKGROUND OF THE INVENTIONS

1. Field of the Inventions

The present inventions relate to an automatic shift control device for performing a shift change automatically, and a vehicle, such as a saddle-type vehicle, provided with the automatic shift control device.

2. Description of the Related Art

Recently, vehicles with electronically actuated manual transmissions have become commercially available. These transmissions are largely the same as any conventional manual transmission, except electronic actuators have been added to allow the otherwise manual transmission to be operated electronically.

The actuators are used to automate certain operations so that the system can automate a series of start, stop and shift change operations (clutch disengagement, gear change, and clutch engagement) based on the rider's intention or the state of the vehicle. In at least one such known automated transmission controller, the torque of the shift actuator is temporarily reduced and then increased when the respective gears cannot engage with each other, i.e., during a so-called "dog-contact condition" occurring at the time of shift change. In the manner, the dog-contact is rectified and the gears then properly engage with each other. For example, Japanese Patent Document No. JP-A-11-082710 discloses such a controller.

SUMMARY OF THE INVENTION

An aspect of at least one of the embodiments disclosed herein includes the realization that when the above-mentioned dog abutment is occurring, it can be impossible to correct the dog abutment solely by cycling the load on the shift actuator. For example, with the system described in Japanese Patent Document No. JP-A-11-082710 it is sometimes impossible to correct the offset between the gears and engage them reliably only by adjusting the torque of the shift actuator.

Thus, in accordance with an embodiment, an automatic shift control device mounted on a vehicle provided with an engine can comprise a friction clutch and a dog clutch gearbox which has a plurality of first gears each having engaging projections, and a plurality of second gears each having engaging recesses engageable with the engaging projections, the gear box being configured to achieve a gear change when the engaging projections of a first gear are engaged with any engaging recesses of a second gear. An automatic shift device can have at least one electric actuator, the automatic shift device can be configured to engage and disengage the friction clutch and to perform a gear change in the dog clutch gearbox. A control unit can be configured to control the actuator to shift a clutch position of the friction clutch to a clutch position on the disengaged side from a first clutch position as a clutch position at which a half clutch state finishes, and engages the friction clutch after a gear change. The control unit can be configured to shift the clutch position of the friction clutch to a second clutch position at which the friction clutch is in a mechanical maximum disengaged state when the vehicle is stopped and when the dog clutch gearbox is in a gear-in state and the engine is being driven, and configured to perform a control to maintain a state in which the clutch position of the friction clutch is at a clutch position between the first clutch position and the second clutch position at the time of a shift change while the vehicle is running.

In accordance with another embodiment, an automatic shift control device mounted on a vehicle provided with an engine can comprise a friction clutch and a dog clutch gearbox having a plurality of first gears each having engaging projections, and a plurality of second gears each having engaging recesses engageable with the engaging projections, the dog clutch gearbox being configured to achieve a gear change when the engaging projections of at least one first gear are engaged with any engaging recesses of at least one second gear. An automatic shift device can have at least one electric actuator, the automatic shift device being configured to engage and disengage the friction clutch and to perform a gear change in the dog clutch gearbox. A control unit can be configured to, at the time of a shift change, control the actuator to change the state of the friction clutch so that a clutch position of the friction clutch reaches a clutch position on the disengaged side from a first clutch position as a clutch position at which a half clutch state finishes, and engages the friction clutch after a gear change. A gear position sensor can be configured to detect a gear position in the dog clutch gearbox. The control unit can be configured to shift the clutch position of the friction clutch to a second clutch position at which the friction clutch is in a mechanical maximum disengaged state when the vehicle is stopped and when the dog clutch gearbox is in a gear-in state and the engine is being driven, and to detect an engaged state in which the engaging projections are engaged with the engaging recesses based on the gear position sensor, and to engage the friction clutch before the clutch position of the friction clutch reaches the second clutch position when the engaged state is established while the clutch position of the friction clutch is on a disengaged side from the first clutch position at the time of a shift change while the vehicle is running.

In accordance with yet another embodiment, a vehicle can comprise a friction clutch and a dog clutch gearbox which has a plurality of first gears each having engaging projections, and a plurality of second gears each having engaging recesses engageable with the engaging projections, the dog clutch gearbox being configured to achieve a gear change when the engaging projections of at least one first gear are engaged with any engaging recesses of at least one second gear. The vehicle can also include an electric actuator, a shift shaft rotated by power of the actuator, and a clutch transmitting mechanism configured to engage and disengage the friction clutch in synchronization with the rotation of the shift shaft. A gearbox transmitting mechanism can be configured to perform a gear change in the dog clutch gearbox in synchronization with the rotation of the shift shaft. At the time of a shift change, the gearbox transmitting mechanism can be driven to perform a gear change in the dog clutch gearbox after the actuator has been driven to rotate the shift shaft, and the clutch transmitting mechanism has been driven to shift the clutch position of the friction clutch to a clutch position on the disengaged side from a first clutch position as a clutch position at which a half clutch state finishes, and then the clutch transmitting mechanism is driven to engage the friction clutch. The clutch position of the friction clutch can be maintained at a clutch position between the first clutch and a second clutch position at which the friction clutch is in a mechanical maximum disengaged state at the time of a shift change during running.

BRIEF DESCRIPTION OF THE DRAWINGS

These and other features, aspects and advantages will now be described with reference to drawings of a preferred embodiment. The drawings comprise the following

DETAILED DESCRIPTION OF THE PREFERRED EMBODIMENT

As described above, dog abutment can sometimes be resolved by adjusting the torque of the shift actuator, as suggested in the prior art. However, even this technique cannot always correct the angle offset between the gears and engage them with each other reliably.

Thus, in some embodiments disclosed herein, during a shift change operation, the friction clutch is first disengaged beyond a clutch position at which the half clutch state finishes (first clutch position) and then a gear change is made. Even when the friction clutch is disengaged beyond the first clutch position, a small amount of driving force is transmitted to a driven-side clutch boss of the friction clutch. The small amount of driving force transmitted to the clutch boss can be used to resolve dog abutment.

Figure 1:
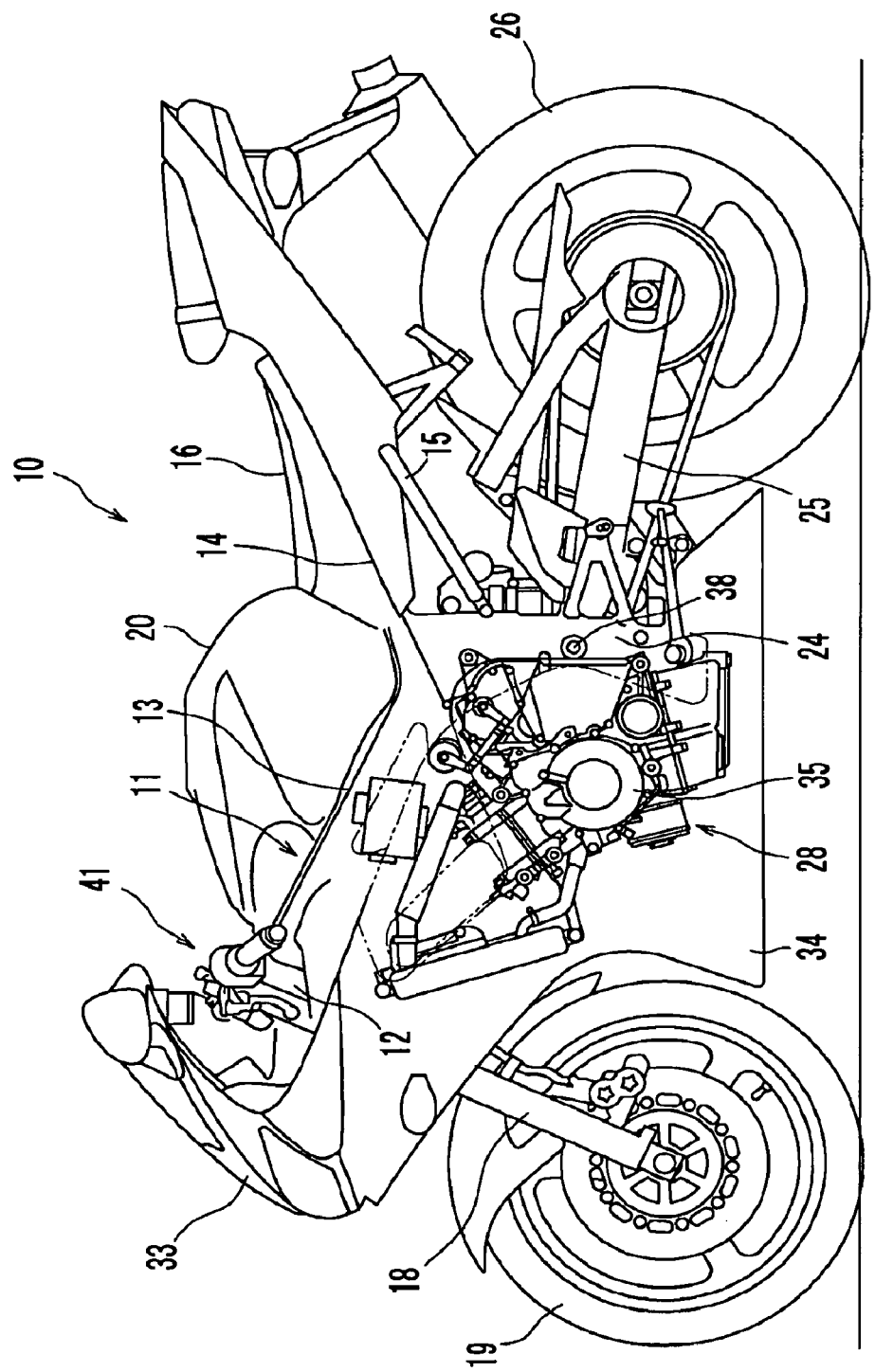
FIG. 1 is a side elevational view of a motorcycle constructed in accordance with an embodiment.

FIG. 1 is a side view of a motorcycle 1 having a transmission arranged and configured in accordance with an embodiment. The transmission is disclosed in the context of a motorcycle because it has particular utility in this context. However, the transmission can be used in other contexts, such as, for example, but without limitation, scooters, automobiles, as well as other vehicles.

With continued reference to FIG. 1, the motorcycle 10 includes a vehicle body frame 11 defining a framework, and a seat 16 on which a rider sits. The seat 16 is configured such that the rider straddles the seat, astride the vehicle body frame 11, during operation.

The shape of the motorcycle 10 is not limited to that shown in FIG. 1, nor are the maximum speed, displacement volume, size, and other conditions of the vehicle limited thereto. Additionally, the inventions disclosed herein are not limited to a so-called motorcycle-type two-wheel vehicle which includes a fuel tank before the seat, but are applicable to other types of two-wheel vehicles. Moreover, the inventions disclosed herein are not limited to two-wheel vehicles, but may be used with other types of saddle-type vehicle. Furthermore, the inventions disclosed herein are not limited to saddle-type vehicles, but can also be used with other types of vehicles such as four-wheel buggy for two riders.

In the following description, the front-and-rear direction and the left-and-right direction are defined as viewed by the rider sitting on the seat 16.

With continued reference to FIG. 1, the vehicle body frame 11 can have a steering head pipe 12, a main frame 13 extending diagonally downward to the rear from the steering head pipe 12, left and right seat rails 14 extending diagonally upward to the rear from the intermediate position of the main frame 13, and left and right seat pillar tubes 15 connected with the rear end of the main frame 13 and the intermediate positions of the seat rails 14.

A front wheel 19 can be supported by the steering head pipe 12 via a front fork 18. A fuel tank 20 and the seat 16 can be supported on the seat rails 14. The seat 16 can extend from above the fuel tank 20 toward the rear ends of the seat rails 14. The fuel tank 20 can be disposed above the front half parts of the seat rails 14.

A pair of left and right rear arm brackets 24 can be provided at the rear end of the main frame 13. In some embodiments, the rear arm brackets 24 and other components provided on the main frame 13 can be considered as forming a part of the vehicle body frame 11. However, other configurations can also be used.

The rear arm brackets 24 project downwardly from the rear end of the main frame 13. Pivot shafts 38 can be equipped on the rear arm brackets 24, and the front ends of rear arms 25 can be supported by the pivot shafts 38 such that the rear arms 25 can freely swing. A rear wheel 26 can be supported by the rear ends of the rear arms 25.

An engine unit 28 for driving the rear wheel 26 can be supported by the vehicle body frame 11. A crank case 35 can be supported by the main frame 13 in such a manner as to be suspended therefrom. In some embodiments, a gasoline engine (not shown) can be provided in the engine unit 28. However, the engine included in the engine unit 28 is not limited to an internal combustion engine such as a gasoline engine, but may be an electric motor, a hybrid gasoline, electric system, or other types of propulsion systems.

The motorcycle 10 can also include a front cowl 33 and left and right leg shields 34. The leg shields 34 can cover components covering the front parts of the rider's legs. However, other configurations can also be used.

Though not shown in FIG. 1, a brake pedal can be equipped in the lower right area of the motorcycle 10. The brake pedal can be a component for braking the rear wheel 26. The front wheel 19 can be braked by operating a brake lever (not shown) provided in the vicinity of a right grip 41R (see FIG. 2) of a handlebar 41.

A clutch lever 104 can be disposed in the vicinity of a left grip 41L of the handlebar 41. In some such embodiments, engagement and disengagement of the clutch can be effected also by operating the clutch lever 104 as well as automatically, described in greater detail below.

Figure 2:
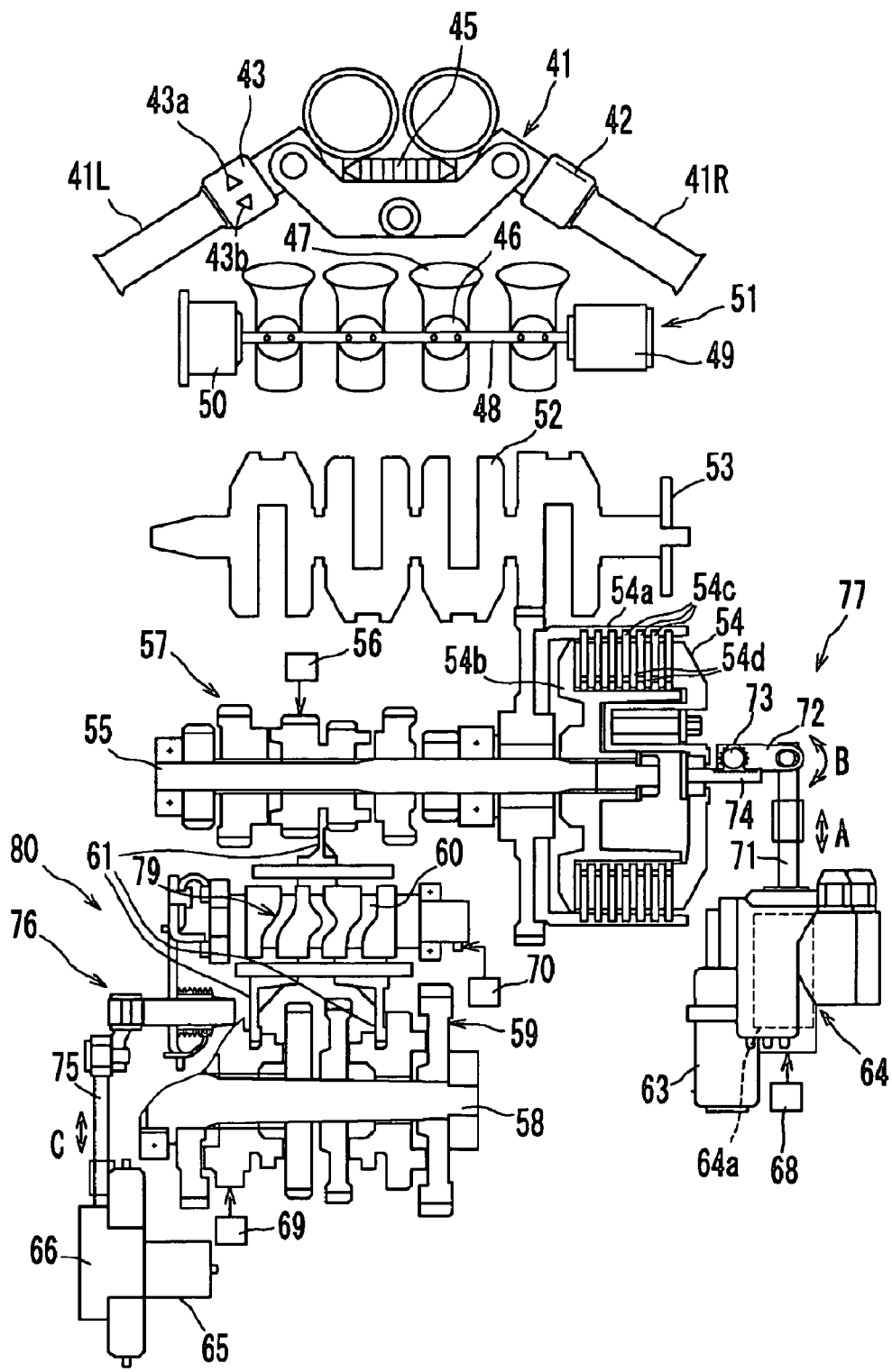
FIG. 2 is a partial exploded and schematic view of a drive system of the motorcycle shown in FIG. 1, the drive system including a transmission.

FIG. 2 illustrates a structure of a driving system that can be used with the motorcycle shown in FIG. 1. In some embodiments, the right grip 41R of the handlebar 41 (see also FIG. 1) comprises a rotatable accelerator grip. A throttle input sensor 42 can be attached to the accelerator grip.

The throttle input sensor 42 can be configured to detect acceleration input (throttle opening input) given by the rider, which can also be referred to as a torque request or power output request. A shift switch 43 can be disposed on the left grip 41L of the handlebar 41, although other locations can also be used.

With continued reference to FIG. 2, the shift switch 43 can include a shift-up switch 43a and a shift-down switch 43b, thereby giving the operator a device for requesting increases and decreases in the gear position. For example, in some embodiments, the motorcycle can be shifted in the range between the neutral position and the maximum gear position (e.g., 6 gear positions in an exemplary but non-limiting embodiment) by manual operation. An indicator 45 can be configured to display the current shift position or the like can be provided at the center of the handlebar 41;

Throttle valves 46 can be attached to throttles bodies 47, which can be considered as forming an air intake passages. A throttle drive actuator 49 can be attached to one end (the right end in the illustrated embodiment) of a valve shaft 48 to which the throttle valves 46 can be rotatably connected. A throttle opening sensor 50 can be attached to the other end (the left end in the illustrated embodiment) thereof. The throttle drive actuator 49 and the throttle opening sensor 50 attached to the valve stem 48 can be considered as forming a DBW (drive by wire) 51 system. However, other configurations can also be used and concerned as forming a drive by wire system. The DBW 51 can be configured to open and close the throttles 47 through the throttle drive actuator 49 based on the detection results from the throttle opening sensor 50, as well as other calculations and/or determinations, described in greater detail below.

An engine revolution sensor 53 can be configured to detect rotation of the crankshaft 52. In the illustrated embodiment, the engine revolution sensor 53 is disposed on the right side of a crankshaft 52. However, other positions can also be used.

The crankshaft 52 can be connected to a main shaft 55 via a wet multi-disc-type clutch 54, although other types of clutches can also be used. The clutch 54 can have a housing 54a and a clutch boss 54b. A plurality of friction plates 54c can be attached to the clutch housing 54a, and a plurality of clutch plates 54d can be attached to the clutch boss 54b. Each of the clutch plates 54d can be interposed between the adjoining friction plates 54c, 54c. As noted above, other types of clutches can be used, including, but without limitation, a dry clutch or a single-plate-type clutch.

The main shaft 55 can have multiple-position (six positions in FIG. 2) transmission gears 57 and a main shaft revolution sensor 56. Each of the transmission gears 57 attached to the main shaft 55 can engage with a corresponding transmission gears 59 attached onto a drive shaft 58 disposed parallel with the main shaft 55. In FIG. 2, the transmission gears 57 and the transmission gears 59 are separated so as to simplify the explanation.

The transmission gears 57, 59 are attached such that either or both of the gears 57, 59, other than the selected gears, are attached to the main shaft 55 or drive shaft 58 during idling of the engine. Thus, driving force can be transmitted from the main shaft 55 to the drive shaft 58 only through a selected pair of the transmission gears. The condition in which the pair of the transmission gears 57 and 59 engage with each other and transmit driving force from the main shaft 55 to the drive shaft 58 is referred to as "gear-in" condition or the "gear position".

The operation for selecting or meshing the desired pair of transmission gears 57 and transmission gears 59 and changing between such pairs can be performed with a shift cam 79. The shift cam 79 can have a plurality of cam grooves 60 (three grooves are illustrated in FIG. 2, although other numbers of grooves can also be used), and shift forks 61 are attached to the respective cam grooves 60.

The respective shift forks 61 engage with the predetermined transmission gears 57 and 59 of the main shaft 55 and drive shaft 58. When the shift cam 79 rotates, the shift forks 61 move along the cam grooves 60 in the axial direction and accordingly the predetermined transmission gears 57, 59 engaging with the splines of the main shaft 55 and drive shaft 58 move in the axial direction. Then, the transmission gears 57, 59 having moved in the axial direction engage with another pair of the transmission gears 57, 59 attached to the main shaft 55 and drive shaft 58 in idling condition to complete the gear change process. The transmission gears 57, 59 and the shift cam 79 can be considered as forming a transmission 80, although other configurations can also be used to form the transmission 80.

Figure 3:
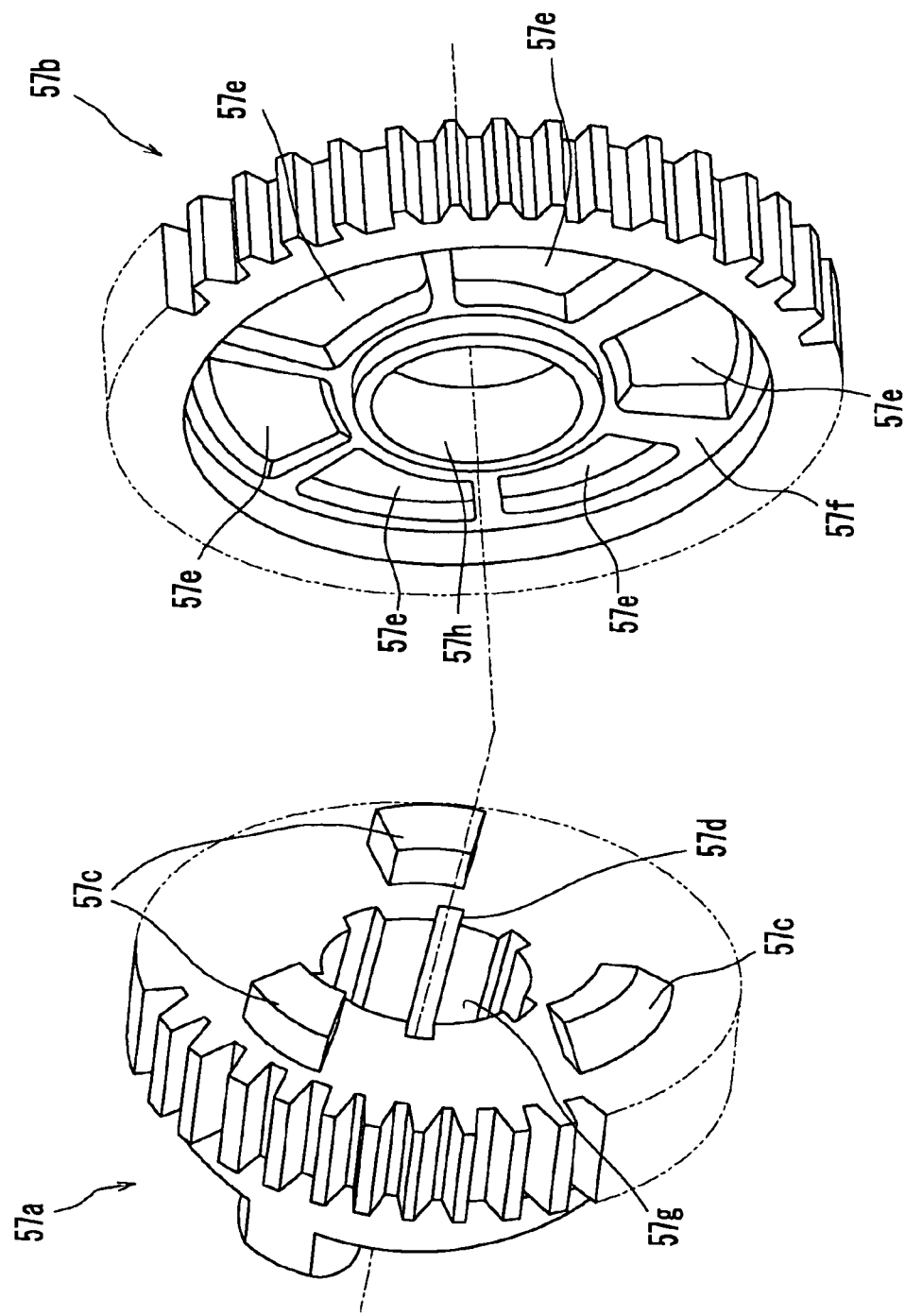
FIG. 3 is a perspective view of two gears that can be used in the transmission of FIG. 2.

The transmission 80 can be a dog-clutch-type transmission. As illustrated in FIG. 3, each of the transmission gears 57 of the transmission 80 has a first gear 57a having engaging projections 57c on an axial end surface thereof, and a second gear 57b having engaging concaves 57e on its axial end surface opposed to the engaging projections 57c. The transmission 80 can include a plurality of first gears 57a and second gears 57b. Also, the transmission 80 can include a plurality of first gears having engaging projections and a plurality of second gears having engaging concaves as the transmission gears 59. Since these structures of the transmission gears 59 are similar to those of the first gears 57a and second gears 57b shown in FIG. 3, explanation of the transmission gears 59 is not repeated herein.

Each of the first gears 57a has the three engaging projections 57c disposed at equal intervals on the outer edge of its axial end surface in the circumferential direction. Each of the second gears 57b has the six engaging concaves 57e also disposed at equal intervals in the circumferential direction. However, other numbers of projections 57c and concaves 57e can also be used.

An insertion hole 57g through which the main shaft 55 and the drive shaft 58 are inserted is formed at the axial center of the first gear 57a. A plurality of grooves 57d are provided along the circumference of the insertion hole 57g. The first gear 57a engages with the splines of the main shaft 55 and the drive shaft 58. The second gear 57b has an insertion hole 57h through which the main shaft 55 and the drive shaft 58 are inserted, but the insertion hole 57h does not have grooves around the hole. Thus, the second gear 57b can be attached to the main shaft 55 and the drive shaft 58 in idling condition.

When the shift cam 79 (FIG. 2) rotates, the shift forks 61 move along the cam grooves 60 and accordingly, the first gear 57a moves along the splines of the main shaft 55 and the drive shaft 58 in the axial direction. Then, the engaging projections 57c of the first gear 57a come to engagement with the engaging concaves 57e of the second gear 57b, thereby changing the combination of the transmission gears 57, 59 for transmitting the driving force from the main shaft 55 to the drive shaft 58 and completing the gear change process.

Additionally, when the shift cam 79 (FIG. 2) rotates, the first gear 57a moves in the axial direction. At this step, the engaging projections 57c of the first gear 57a do not engage with the engaging concaves 57e of the second gear 57b but contact an axial end face 57f of the second gear 57b in dog-contact condition in some cases. Under the dog-contact condition, the first gear 57a and second gear 57b do not engage but contact with each other, failing to securely attain gear change.

As illustrated in FIG. 2, the clutch 54 and the transmission 80 can be operated by a clutch actuator 63 and a shift actuator 65, respectively. The clutch actuator 63 can be connected with the clutch 54 via a hydraulic transmission mechanism 64, a rod 71, a lever 72, a pinion 73, and a rack 74.

The hydraulic transmission mechanism 64 can also include a hydraulic cylinder 64a, an oil tank (not shown), a piston (not shown) and other components. The hydraulic transmission mechanism 64 can also be configured to generate hydraulic pressure by the operation of the clutch actuator 63 and transmits the hydraulic pressure to the rod 71. The rod 71 thus reciprocates in the direction indicated by an arrow A by the operation of the clutch actuator 63, thereby rotating the lever 72 in the direction indicated by an arrow B. As a result, the clutch 54 can be connected or disconnected in accordance with the movement direction of the rack 74. While an electric motor can be used as the clutch actuator 63 in some embodiments, other devices such as a solenoid and an electromagnetic valve, or other actuators can also be used.

An automated transmission controller can comprise the transmission 80, the shift actuator 65, a deceleration mechanism 66, a rod 75, a link mechanism 76, an ECU 100 (FIG. 4) for controlling the operations of the clutch actuator 63 and shift actuator 65. However, other configurations can also be used. An automated clutch device 77 can comprise the clutch 54, the clutch actuator 63, the hydraulic transmission mechanism 64, the rod 71, the lever 72, the pinion 73, and the rack 74. However, other configurations can also be used.

The shift actuator 65 can be connected with the shift cam 79 via the deceleration mechanism 66, a spring 85, the rod 75, and the link mechanism 76. The deceleration mechanism 66 can have a plurality of reduction gears (not shown).

At the time of gear change, the rod 75 reciprocates in the direction indicated by an arrow C by the operation of the shift actuator 65, and the shift cam 79 rotates through a predetermined angle via the link mechanism 76. Then, the shift forks 61 move along the cam grooves 60 by a predetermined amount in the axial direction. As a result, a pair of the transmission gears 57, 59 are fixed to the main shaft 55 and the drive shaft 58, respectively, and thus driving force can be transmitted from the main shaft 55 to the drive shaft 58. While an electric motor can be used as the shift actuator 65 in some embodiments, other devices such as solenoid, an electromagnetic valve, or other devices can also be used.

The hydraulic transmission mechanism 64 connected with the clutch actuator 63 can include a clutch position sensor 68 for detecting a position of the clutch (e.g., a distance between the friction plates 54c and the clutch plates 54d) based on the detection of the stroke position of the piston. While the clutch position can be detected by the clutch position sensor 68 which detects the stroke position of the piston in some embodiments, the clutch position may be detected based on the detection of the position of the transmission mechanism provided between the clutch actuator 63 and the clutch 54.

For example, the clutch position can be detected based on the detection of the position of the rod 71 or the rack 74. The detection of the clutch position is not limited to indirect detection based on the detected stroke position of the piston as in the illustrated embodiment, but can be through direct measurement of the distance between the friction plates 54c and the clutch plates 54d using a sensor (not shown).

The drive shaft 58 can have a vehicle speed sensor 69. The shift cam 79 can have a gear position sensor 70 configured to detect the gear position (e.g., a rotational position of the shift cam 79).

The ECU 100 (engine control unit) can be configured to control the operation of the clutch actuator 63 and the shift actuator 65 in accordance with the operation of the shift-up switch 43a or the shift-down switch 43b to execute shift change. For example, the ECU 100 can be configured to execute a sequential processes involving starting gear change of the transmission gears 57, 59 by the shift actuator 65, disconnecting the clutch 54 by the clutch actuator 63 after elapse of a predetermined time from the start of gear change, and connecting the clutch 54 by the clutch actuator 63, in this order, under a predetermined program or a map at the time of running of the vehicle. However, the ECU 100 can be configured to execute other gear changing processes as well as other operations for the operation of the motorcycle 10.

Figure 4:
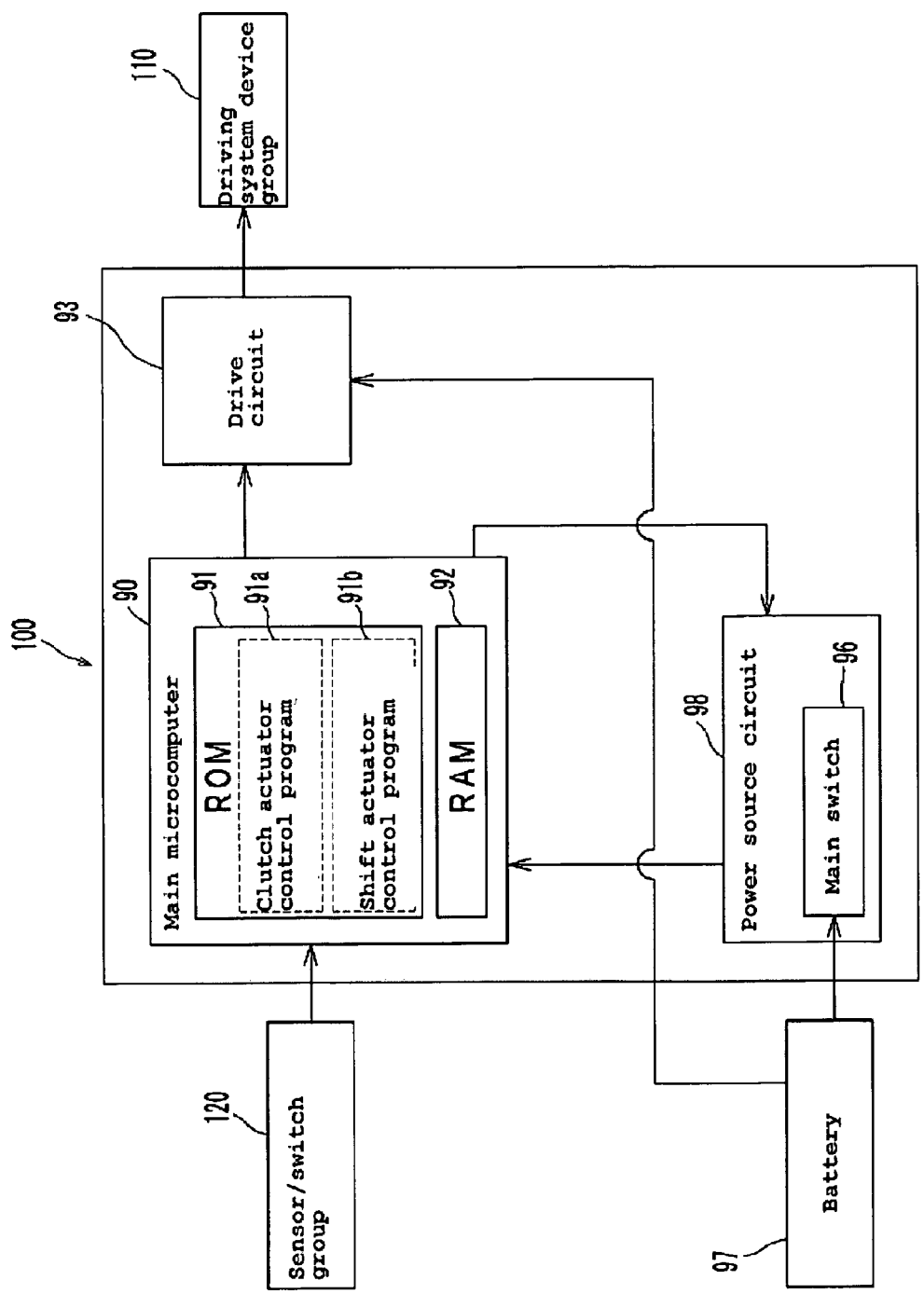
FIG. 4 is a block diagram illustrating a control system that can be used with the motorcycle of FIG. 1.

FIG. 4 is a block diagram illustrating an exemplary structure of a gear change contoller that can be provided on the motorcycle 10 for performing gear changes. A drive system group 110 can be connected with a main microcomputer 90 contained in the ECU 100 via a drive circuit 93.

The ECU 100 can be considered as forming a control unit or a gear change controller, However, the gear change controller disclosed herein can also be constructed in other ways. For example, the gear change controller can be in the form of one or a plurality of hard-wired feedback control circuits. Alternatively, the gear change controller can be constructed of a dedicated processor and a memory for storing a computer program configured to perform the control routine of FIG. 7. Additionally, the gear change controller can be constructed of a general purpose computer having a general purpose processor and the memory for storing the computer program for performing the routine of FIG. 7. Preferably, however, the gear change controller is incorporated into the ECU 100, in any of the above-mentioned forms.

Figure 5:
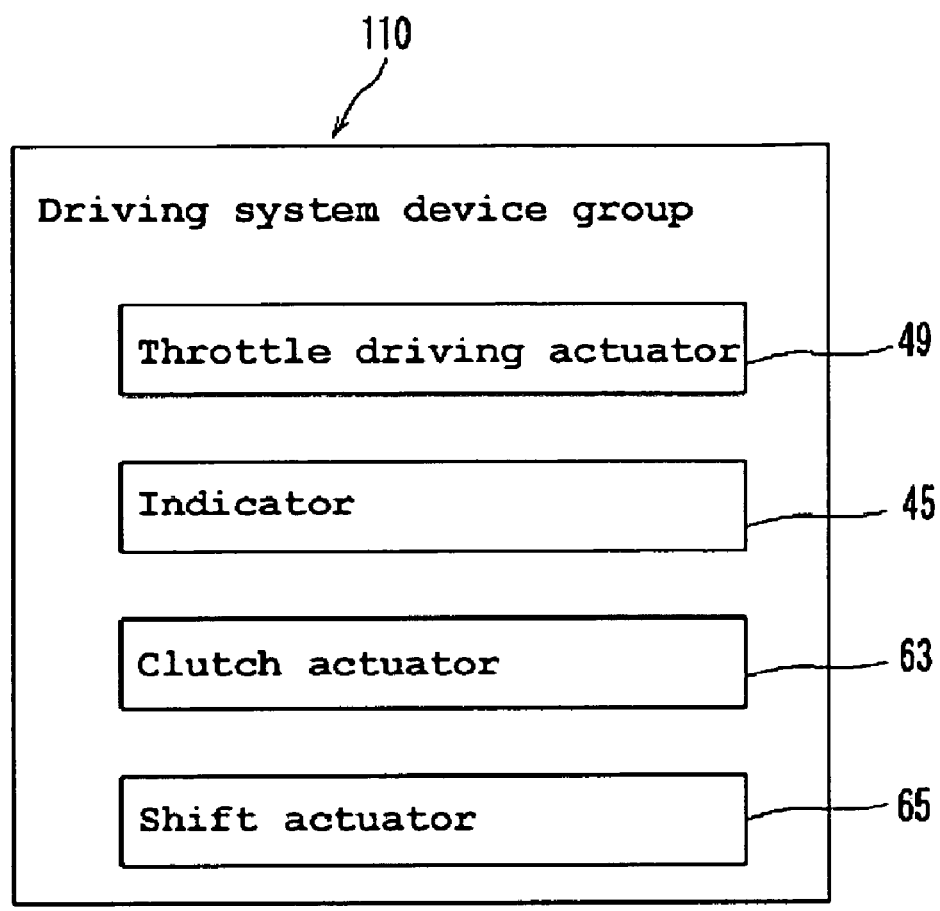
FIG. 5 is a block diagram illustrating a drive system group that can be use with the control system of FIG. 4.

As shown in FIG. 5, the drive system group 110 can include the throttle drive actuator 49, the indicator 45, the clutch actuator 63, and the shift actuator 65 (see also FIG. 2). The drive circuit 93 can be configured to supply appropriate electric current to the respective devices of the drive system group 110 from a battery 97 in response to drive signals sent from the main microcomputer 90. A sensor and switch group 120 can be connected with the main microcomputer 90.

Figure 6:
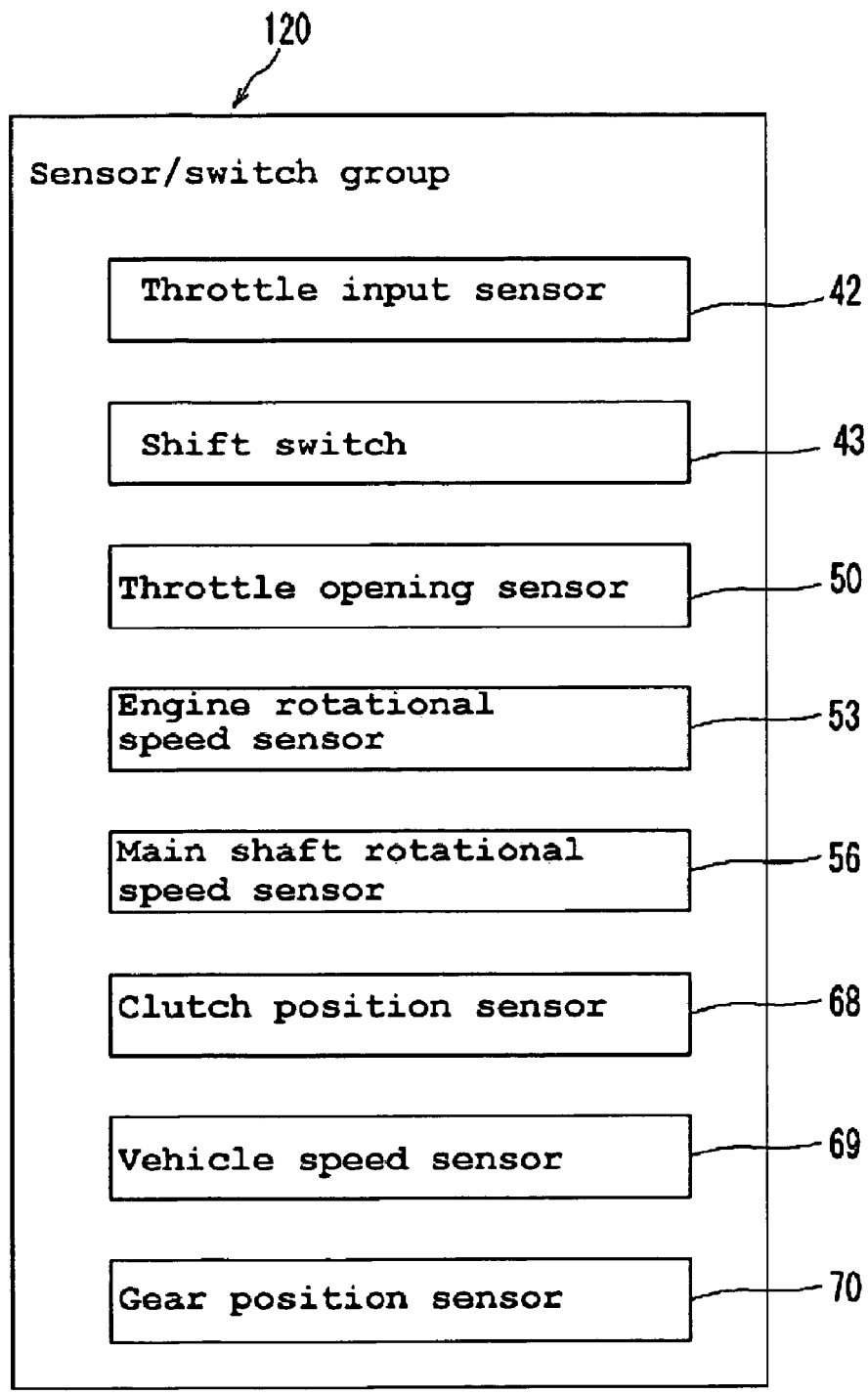
FIG. 6 is a block diagram illustrating a sensor and switch group that can be use with the control system of FIG. 4.

As shown in FIG. 6, the sensor and switch group can be constituted by the throttle input sensor 42, the shift switch 43, the throttle opening sensor 50, the engine revolution sensor 53, the main shaft revolution sensor 56, the clutch position sensor 68, the vehicle speed sensor 69, and the gear position sensor 70 (see also FIG. 2), as well as other sensors. The detection results from the respective sensors can be input to the main microcomputer 90, and then the main microcomputer 90 can supply drive signals to the respective devices constituting the drive system group 110 based on the detection results obtained from the respective sensors to control the operations of these devices.

The main microcomputer 90 can have a ROM 91 and a RAM 92. The ROM 91 can be used to store a clutch actuator control program 91a and a shift actuator control program 91b. The clutch actuator control program 91a can be a program for controlling the operation of the clutch actuator 63. The shift actuator control program 91b can be a program for controlling the operation of the shift actuator 65. The ROM 91 can be constructed in a manner that makes it is impossible for a user to delete these programs stored in the ROM 91, or to write new programs or the like to the ROM 91. However, other types of memory can also be used.

For executing the clutch actuator control program 91a or the shift actuator control program 91b, either of these programs can be loaded into the RAM 92 and read by the main microcomputer 90. Then, the main microcomputer 90 controls the operation of the clutch actuator 63 or the shift actuator 65 under the program in the RAM 92.

A power source circuit 98 connected with the battery 97 can have a main switch 96 which can be turned on or off in accordance with the operation of a key switch (not shown). When the main switch 96 is turned on, the power source circuit 98 converts voltage of the battery 97 into driving voltage for the main microcomputer 90 and supplies the converted voltage to the main microcomputer 90.

Figure 7:
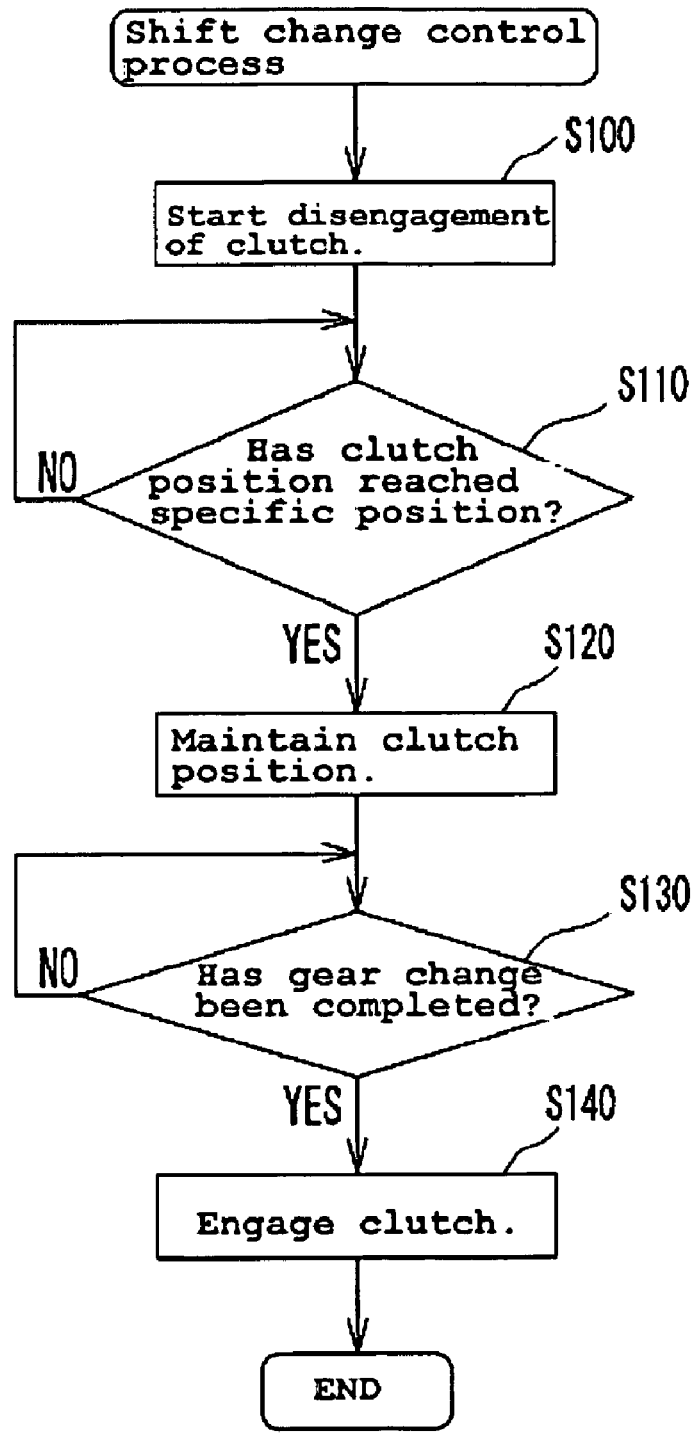
FIG. 7 is a flowchart showing a shift change control process that can be used for operating the control system of FIG. 4.

FIG. 7 is a flowchart illustrating a shift change control process that can be used during generation of a vehicle such as the motorcycle 10. When a shift change is requested by a rider of the motorcycle, e.g., when a rider operates the shift-up switch 43a or the shift-down switch 43b, the shift change control process of FIG. 7 can be used to carry out the rider's desire for a gear change. The procedures shown in FIG. 7 can be carried out for all gear changes, including when the motorcycle 10 is stopped.

First, in the routine of FIG. 7, the ECU 100 can start disengagement of the clutch 54 in a step S100. For example, the ECU 100 can feed a drive signal to the clutch actuator 63 to cause the clutch actuator 63 to start disengagement of the clutch 54. When disengagement of the clutch 54 is started, the friction plates 54c and the clutch plates 54d of the clutch 54 move apart from each other at a constant speed. However, other techniques can also be used for disengaging the clutch 54.

After the process in the step S100 is executed, in a step S110, it can be determined whether or not the clutch position has reached a specific position. For example, the ECU 100 can determine whether or not the clutch position of the clutch 54 has reached a specific position based on the result of detection by the clutch position sensor 68 (FIG. 2). If it is determined that the clutch position has not reached the specific position, the routine returns the process to the step S110 and waits until the clutch position reaches the specific position If it is determined that the clutch position has reached a specific position in the step S110, a process to maintain the clutch position is next performed in a step S120. In some embodiments, the process to maintain the clutch position is a process to hold the clutch position at a fixed position. For example, the ECU 100 can stop the feed of drive signal to the clutch actuator 63 to stop the clutch actuator 63. The clutch position is thereby held at a specific position determined in the step S110. While the clutch position is being held, part of engine driving force is transmitted to the clutch boss 54b, and, if dog abutment is occurring between the first gears 57a and the second gears 57b, the first gears 57a and the second gears 57b rotate relative to each other while staying in contact with each other.

When the process in the step S120 is executed, it is next determined whether or not a gear change has been completed in a step S130 For example, the ECU 100 can determine whether or not a gear change has been completed based on the result of detection by the gear position sensor 70 (FIG. 2 and FIG. 6). If it is determined that a gear change has not been completed, the ECU 100 can return the process to a step S130 and wait until a gear change is completed. If dog abutment as describe above has occurred, the dog abutment is resolved when it is determined that a gear change is completed by the process in the step S130.

If it is determined that a gear change has been completed in the step S130, a process to engage the clutch is next performed in a step S140. For example, the ECU 100 can feed a drive signal to the clutch actuator 63 to cause the clutch actuator 63 to engage the clutch 54. When this process is executed, the clutch 54 can be engaged at a constant speed until it reaches a specific clutch position. When the process in the step S140 is executed, the shift change control process is ended.

Figure 8:
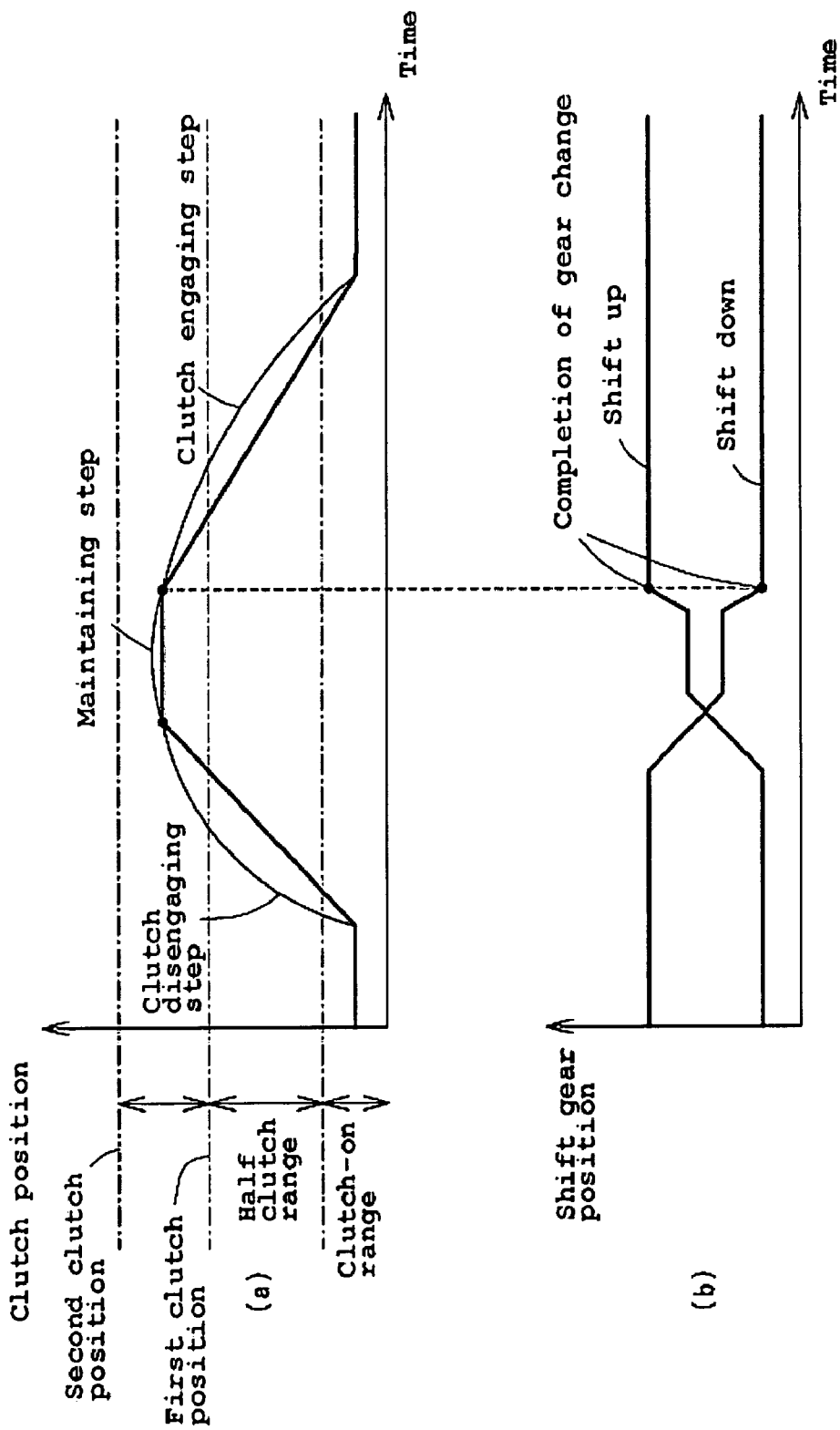
FIG. 8 illustrates a change in clutch position over time during a shift change.

FIG. 8 is a view illustrating a change in the clutch position over time while the gear shift control process shown in FIG. 7 is executed. In FIG. 8(a), the clutch position is shown from the start to completion of a shift change. In FIG. 8(b), a change in the shift gear position (gear position) is shown from the start to completion of an up-shift.

As shown in FIG. 8(a), the clutch 54 can be disengaged at a constant speed in the clutch disengaging step. Then, when the clutch position of the clutch 54 reaches a specific position between a first clutch position and a second clutch position, the clutch position is held. The first clutch position can be a clutch position at which the half clutch state finishes, and is the lower limit of the distance between the friction plates 54c and the clutch plates 54d when the two-wheeled motor vehicle 10 is stopped and idling and when the vehicle body does not move forward and is held stopped. The second clutch position can be a clutch position at which the clutch 54 is in a mechanical maximum disengaged state.

In the two-wheeled motor vehicle 10 in some embodiments, the clutch position of the clutch 54 can be held at the second clutch position when the vehicle is stopped and when the gearbox 80 is in the gear-in state and the engine is being driven. When dog abutment is occurring between the shift gears 57a and 57b while the clutch position of the clutch 54 is maintained in a position between the first clutch position and the second clutch position, the shift gears 57a and 57b rotate relative to each other while staying in contact with each other.

Then, when the completion of a gear change is detected by the gear position sensor 70, a clutch engaging step can be started. In the clutch engaging step, the clutch 54 can be engaged at a constant speed.

As described above, in some embodiments, when the clutch position of the clutch 54 reaches a specific position between the first clutch position and the second clutch position in the clutch disengaging step, the clutch position is held. Then, a clutch engaging step is started after the completion of a gear change has been detected. That is, in the clutch disengaging step, the clutch 54 is not disengaged up to the second clutch position.

As described above, in the two-wheeled motor vehicle 10 according to some embodiments, a state in which the clutch position is between the first clutch position (a clutch position at which the half clutch state finishes) and the second clutch position (a clutch position at which the clutch 54 is in a mechanical maximum disengaged state) is maintained during the operation to disengage and engage the clutch 54 at the time of a shift change. Therefore, even if dog abutment occurs between the first gears 57a and the second gears 57b, the dog abutment can be resolved properly. As a result, a gear change can be carried out properly whenever the shift up switch 43a or the shift down switch 43b is operated.

Also, in the two-wheeled motor vehicle 10 according to some embodiments, since the clutch position of the clutch 54 is not disengaged up to the second clutch position during the operation to disengage and engage the clutch 54, the time necessary for the operation to disengage and engage the clutch 54 can be shortened.

Also, in the two-wheeled motor vehicle 10 according to some embodiments, the clutch position of the clutch 54 can be held at a specific position between the first clutch position and the second clutch position for a prescribed period of time during the operation to disengage and engage the clutch 54. Therefore, a certain driving force (part of engine driving force) can be applied to the clutch boss 54, and reliability in rotating the first gears 57a and the second gears 57b relative to each other can be improved when dog abutment is occurring.

Also, in the two-wheeled motor vehicle 10 according to some embodiments, a step of engaging the clutch 54 can be started in response to the completion of a gear change detected by the gear position sensor 70. Therefore, a step of engaging the clutch 54 can be started quickly after the completion of a gear change, and the time necessary for the operation to disengage and engage the clutch 54 can be shortened.

As noted above, the clutch position of the clutch 54 can be maintained between the first clutch position and the second clutch position until a dog abutment state is resolved at the time of a shift change. The manner of change in the clutch position is not limited to the manner shown in FIG. 8. The term "maintain", as used herein, refers to keeping the clutch position in a positional range between the first clutch position and second clutch position and is not necessary to hold the clutch position at a fixed position. Other methods of maintaining the clutch position can also be used.

Figure 9:
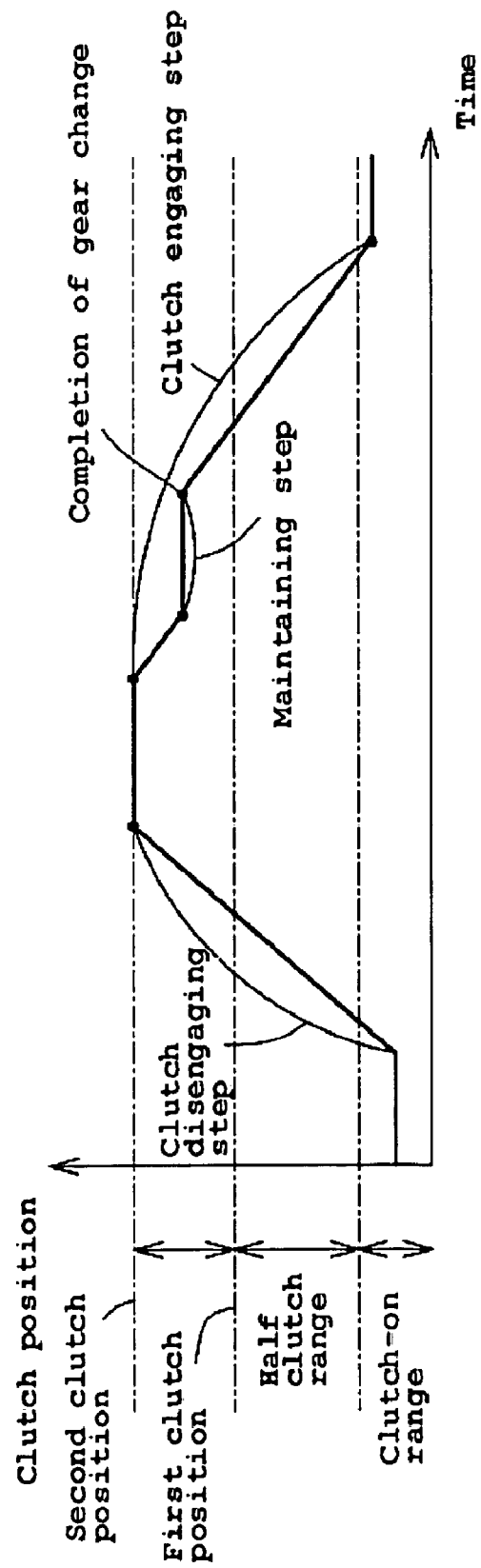
FIG. 9 illustrates another change in clutch position over time during a shift change in a two-wheeled motor vehicle.

For example, with reference to FIG. 9, the clutch 54 can be disengaged at a constant speed and held at a second clutch position for a prescribed period of time in the clutch disengaging step, and then a clutch engaging step can be started. In the clutch engaging step, the clutch 54 can be engaged until the clutch position of the clutch 54 reaches a specific position between the first clutch position and the second clutch position, and then held in the position. Then, when completion of a gear change is detected, the clutch 54 can be moved closer until it becomes a clutch-on state.

As shown in FIG. 9, in the two-wheeled motor vehicle according to some embodiments, the clutch 54 can be once disengaged until the clutch position reaches the second clutch position, and then held in the position for a prescribed period of time in the clutch disengaging step. When the shift actuator 65 is configured to start a gear change while the clutch position is held at the second clutch position, the shift gears 57 (shift gears 59) engaged with each other can be separated from each other easily.

Figure 10:
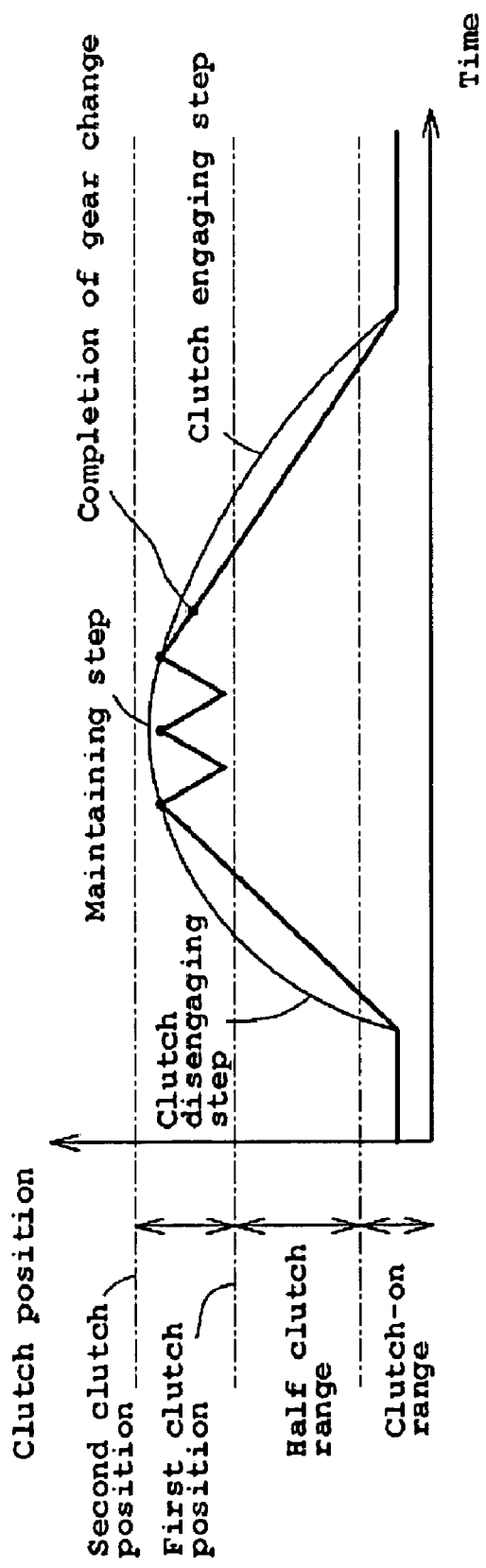
FIG. 10 illustrates another change in clutch position over during a shift change in a two-wheeled motor vehicle according to a third embodiment.

FIG. 10 illustrates another exemplary change in clutch position over time at the time of a shift change in a two-wheeled motor vehicle 10. As shown in FIG. 10, engagement and disengagement of the clutch 54 can be repeated within a range between the first clutch position and the second clutch position after the clutch 54 has been disengaged until the clutch position reaches a specific position between the first clutch position and the second clutch position in the clutch disengaging step. Then, when completion of a gear change can be detected, a clutch engaging step can be started.

As shown in FIG. 10, in the two-wheeled motor vehicle according to some embodiments, the clutch position of the clutch 54 can be once shifted to the engaged side and then to the disengaged side within a range between the first clutch position and the second clutch position. That is, the clutch position can be changed within a range between the first clutch position and the second clutch position such that the driving force (part of engine driving force) to be transmitted to the clutch boss 54b can be once increased and then decreased. This embodiment also falls under the same category as the embodiment in which "a state in which the clutch position is between the first clutch position and the second clutch position can be maintained." In some embodiments, effects generally the same as those of the first embodiment can be obtained.

Figure 11:
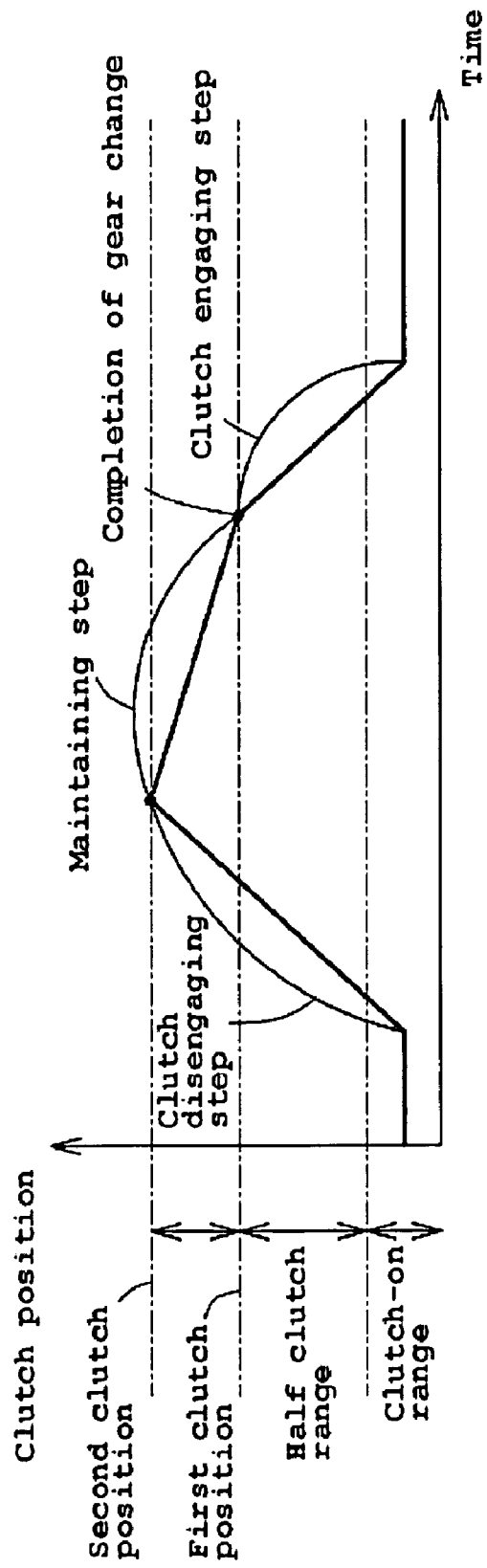
FIG. 11 illustrates another change in clutch position over time during a shift change in a two-wheeled motor vehicle.

FIG. 11 is a view illustrating another exemplary change in clutch position over time at the time of a shift change in a two-wheeled motor vehicle according to some embodiments. As shown in FIG. 11, the clutch 54 can be disengaged until the clutch position reaches the second clutch position in the clutch disengaging step, and then the clutch 54 can be engaged at a low speed. Then, when the clutch position of the clutch 54 reaches the first clutch position, the approach speed can be increased.

As shown in FIG. 11, in the two-wheeled motor vehicle 10 according to some embodiments, the engaging speed of the clutch 54 can be changed so that the clutch 54 can be engaged gradually between the first clutch position and the second clutch position. By decreasing the engaging speed of the clutch 54 as described above, a state in which the clutch position of the clutch 54 can be between the first clutch position and the second clutch position can be maintained. Therefore, in some embodiments, the effects described before can be obtained.

Figure 12:
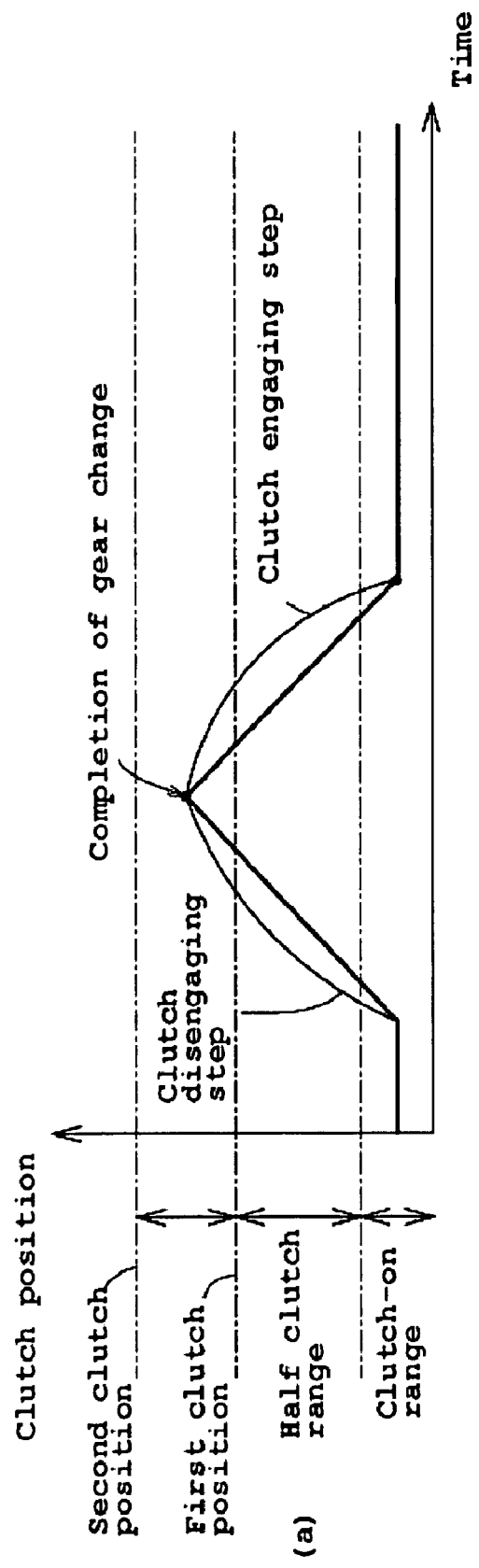
FIG. 12 illustrates another change in clutch position over time during a shift change in a two-wheeled motor vehicle.

FIG. 12 is a view illustrating a further exemplary change in clutch position over time at the time of a shift change in a two-wheeled motor vehicle 10 according to some embodiments. As shown in FIG. 12, when the gear position sensor 70 detects completion of a gear change while the clutch position of the clutch 54 is beyond the first clutch position in the clutch disengaging step, a clutch engaging step can be started straight away.

In some embodiments, when the gear position sensor 70 detects completion of a gear change when the clutch position of the clutch 54 has been shifted to the disengaged side beyond the first clutch position during disengagement of the clutch 54, a clutch engaging step can be started straight away. When a gear change is completed during disengagement of clutch, there is no need to maintain the clutch 54 between the first clutch position and the second clutch position to resolve dog abutment. Therefore, when a clutch engaging step is started straight away after the detection of completion of a gear change, the time necessary to disengage and engage the clutch 54 can be shortened.

In the above embodiments, a case in which the clutch position of the clutch 54 is maintained between the first clutch position and the second clutch position before completion of a gear change can be detected by the gear position sensor 70 is described. However, other embodiments of the present inventions are not limited to the aspects in which a gear change is detected and the maintenance of the clutch position can be released based on the detection. The period of time for which the above clutch position is maintained may be set in advance. That is, a preset specific period of time may be stored in the ROM 91 or the like as a period of time from when a dog abutment state occurs to when the first gears 57a and the second gears 57b are engaged with each other and the dog abutment state is resolved, and the clutch position can be maintained between the first clutch position and the second clutch position until the period of time elapses. In this configuration, effects generally the same as those of the above embodiments can be obtained.

In the above embodiments, a case in which the clutch 54 and the gearbox 80 are driven by different actuators (clutch actuator 63 and shift actuator 65) is described. The present inventions, however, can be embodied in systems in which the clutch and the gearbox are driven by one actuator.

Figure 13:
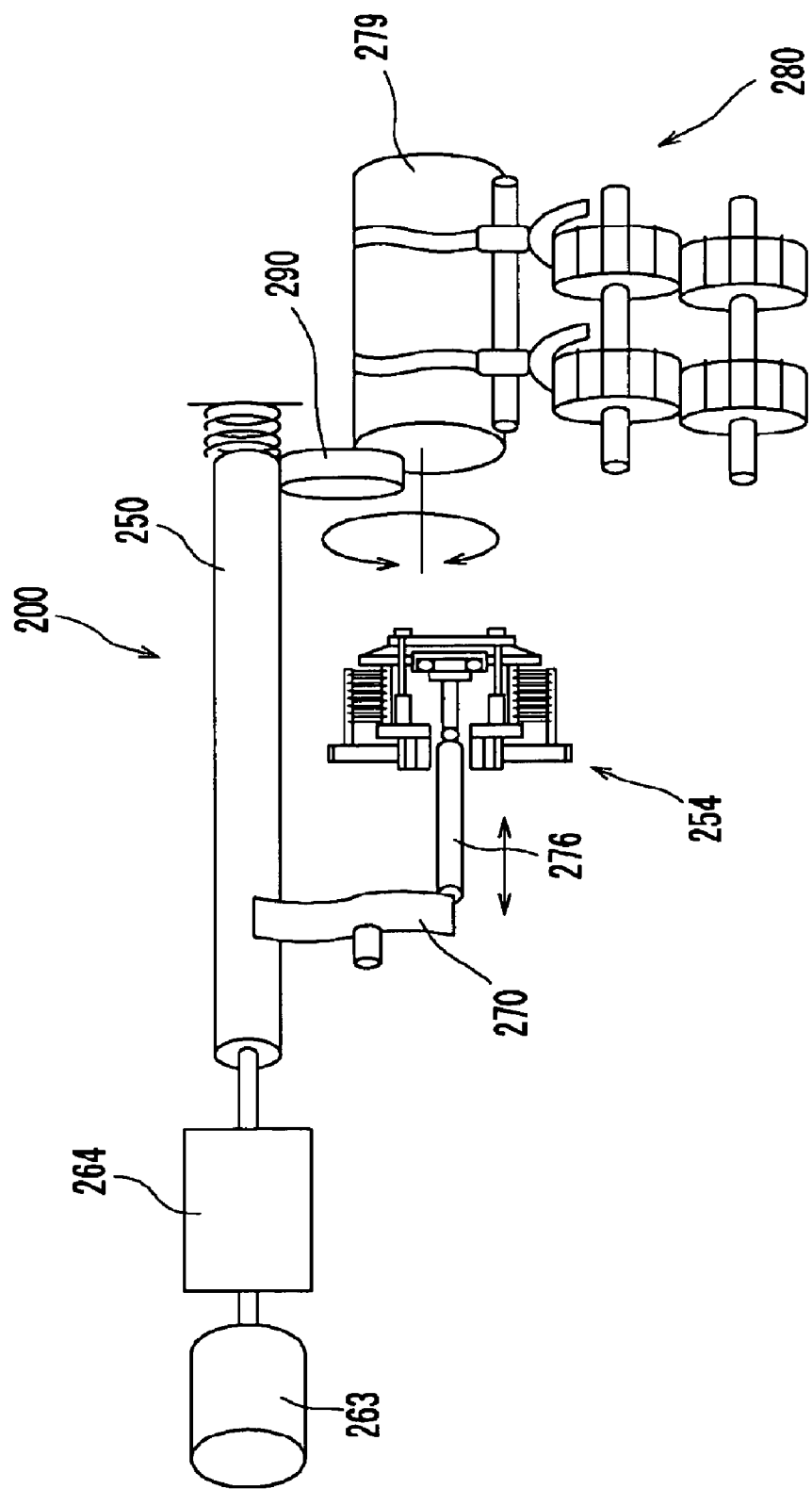
FIG. 13 is a view illustrating the general configuration of an automatic shift device that can be provided in a two-wheeled motor vehicle.

FIG. 13 is a view illustrating a general configuration of an automatic shift device provided in a two-wheeled motor vehicle 10 according to some embodiments. As shown in FIG. 13, in an automatic shift device 200 of the two-wheeled motor vehicle 10, engagement and disengagement of a clutch 254 and a gear change in a gearbox 280 can be made by the same actuator 263. Although the actuator 263 can be a motor in some embodiments, the actuator is not limited to a motor and may be a solenoid or an electromagnetic valve, or any other kind of actuator.

In some embodiments, the rotating movement of the actuator 263 can be reduced in speed by the reduction mechanism 264 and transmitted to a shift shaft 250 to rotate the shift shaft 250. The rotating movement of the shift shaft 250 can be converted into axial reciprocating movement of a push rod 276 by a clutch transmitting mechanism 270, and the clutch 254 can be engaged or disengaged by the reciprocating movement of the push rod 276.

The rotating movement of the shift shaft 250 can be also converted by a gearbox transmitting mechanism 290 into rotating movement of a shift cam 279, by which a gear change in the gearbox 280 can be carried out. Although not shown in FIG. 13, the two-wheeled motor vehicle 10 can have a starting centrifugal clutch. The clutch 254 shown in FIG. 13 can be a clutch for shift change.

Figure 14:
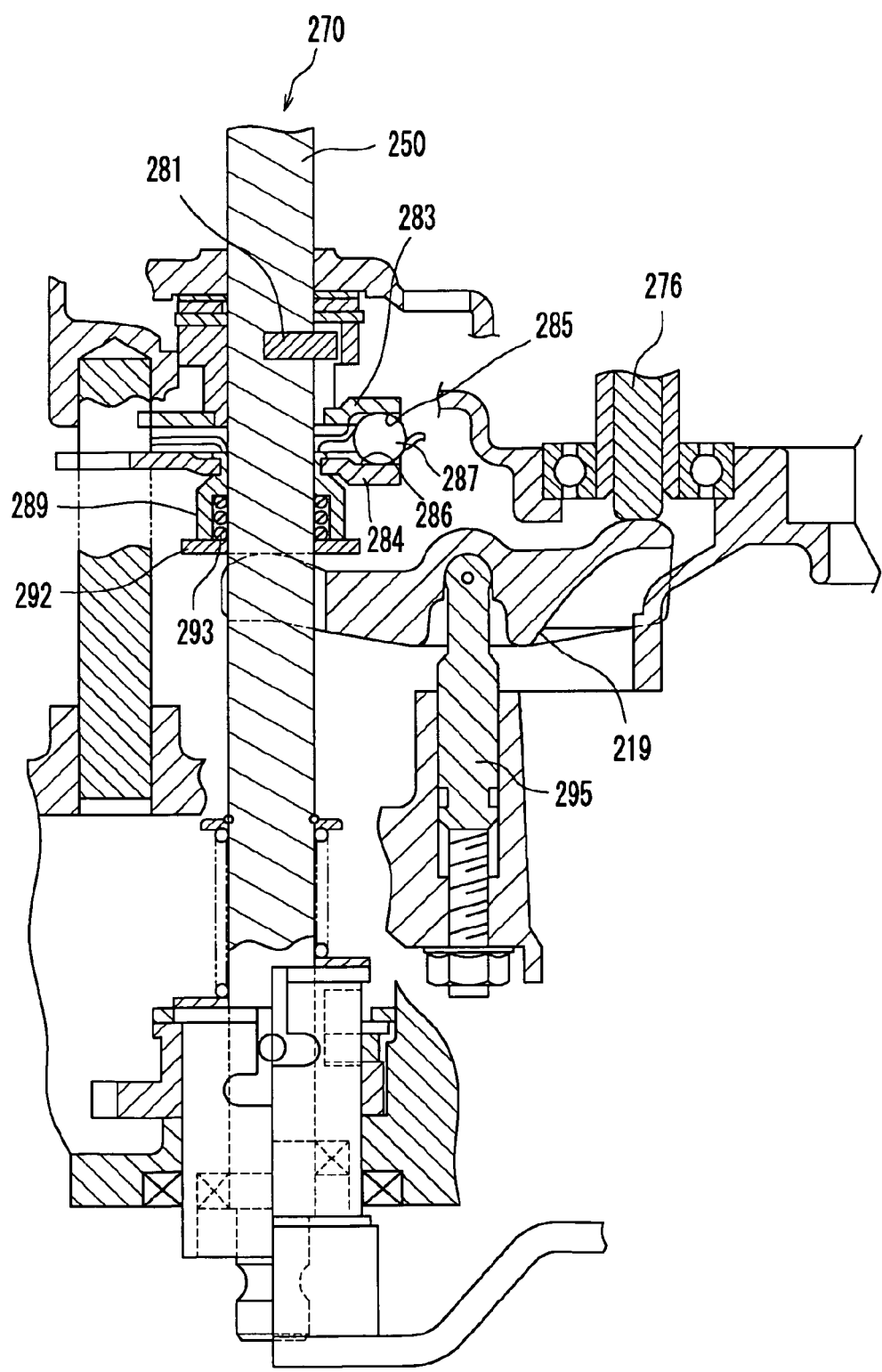
FIG. 14 is a cross-sectional view illustrating a clutch transmitting mechanism shown in FIG. 13.

FIG. 14 is a cross-sectional view illustrating a clutch transmitting mechanism 270 shown in FIG. 13. The clutch transmitting mechanism 270 shown in FIG. 14 can be a ball cam mechanism for converting the rotation of the shift shaft 250 into reciprocating movement. The clutch transmitting mechanism 270 can have a first cam plate 283 connected to the shift shaft 250 via a connecting pin 281 and rotatable together with the shift shaft 250. A second cam plate 284 can be positioned facing the first cam plate 283. Three balls 287 (only one of them is shown in FIG. 14) can be received in first and second cam grooves 285 and 286 formed in the opposed faces of the first cam plate 283 and the second cam plate 284, respectively, and held between the cam plates 283 and 284. The first and second cam plates 283 and 284 can both have a disk-like shape. Also, the first cam plate 283 can be secured to the shift shaft 250.

The second cam plate 284 can be secured to a boss 289 movable in the axial direction of the shift shaft 250, and a pressing plate 292 in contact with a pressure lever 219, which is described below, can be secured to the lower end of the boss 289. A compression coil spring 293 can be interposed between the pressing plate 292 and the boss 289.

The left end of the pressure lever 219 can be in contact with the pressing plate 292, and the right end of the pressure lever 219 can be in contact with the push rod 276 (see also FIG. 13). A longitudinal intermediate portion of the pressure lever 219 can be supported by a spindle 295. The pressure lever 219 can be swingable about the contact point between it and the spindle 295.

When the shift shaft 250 rotates in synchronization with the rotation of the actuator 263 (see FIG. 13), the first cam plate 283 can also rotate in synchronization with the shift shaft 250. Since the second cam plate 284 does not rotate in synchronization with the shift shaft 250, the first cam plate 283 rotates relative to the second cam plate 284. At this time, the balls 287 move circumferentially in the cam groove 286 of the second cam plate 284 while being maintained in the cam groove 285 of the first cam plate 283. When the shift shaft 250 further rotates, the balls 287 roll over the cam groove 286 and get out of the cam groove 286. When the balls 287 get out of the cam groove 286, the second cam plate 284 can be moved along the axis direction of the shift shaft 250, whereby the left end of the pressure lever 219 can be pressed by the boss 289. When the left end of the pressure lever 219 can be pressed by the boss 289, the pressure lever 219 swings about the contact point between it and the spindle 295, whereby the push rod 276 can be pressed by the right end of the pressure lever 219. Then, when the push rod 276 can be pressed by the pressure lever 219, the clutch 254 can be disengaged.

When the balls 287 roll over the cam groove 286 and get out of the cam groove 286, the distance between the first cam plate 283 and the second cam plate 284 can be maximum. At this time, the distance between the friction plates and clutch plates of the clutch 254 can be maximum. In some embodiments, the clutch transmitting mechanism 270 can be configured such that the clutch position at the time when the clutch 254 can be in the maximum disengaged state can be located at a position between the first clutch position and the second clutch position.

Although the clutch position can be maintained between the first clutch position and the second clutch position by performing drive control of the clutch actuator 63 in the first to fifth embodiments, the clutch position at the time when the clutch 254 can be in a mechanical maximum disengaged state can be located at a position between the first clutch position and the second clutch position in the sixth embodiment. Also in the sixth embodiment, since the clutch position can be maintained between the first clutch position and the second clutch position for a prescribed period of time, effects generally the same as those of the first embodiment can be obtained.

In the clutch, the distance between the friction plates and the clutch plates at the time when half clutch can be started and when a complete disengaged state can be established may change because of wear, deterioration and so on of the friction plates and the clutch plates. Therefore, the first clutch position and the second clutch position may change because of wear, deterioration and so on of the friction plates and the clutch plates. Also, the first clutch position and the second clutch position are different in different clutches. Therefore, it is preferred in the that the friction clutch be engaged gradually while the clutch position can be maintained at a specific position between preset first and second clutch positions. Then, since the clutch position can be maintained between the first clutch position and the second clutch position for a prescribed period of time even when the clutch has been worn or deteriorated or when there are varieties among clutches, possible occurrence of dog abutment can be resolved properly.

In some embodiments, the control to maintain the clutch position of the friction clutch between the first clutch position and the second clutch position is not necessarily performed at every shift change and may be performed only at some of them. For example, the above control may be performed only at the time of a shift change to a specific gear position (for example, first or second gear position).

Although the present inventions have been described in terms of certain embodiments, other embodiments apparent to those of ordinary skill in the art also are within the scope of these inventions. Thus, various changes and modifications may be made without departing from the spirit and scope of the inventions. For instance, various components may be repositioned as desired. Moreover, not all of the features, aspects and advantages are necessarily required to practice the present inventions.

What is claimed is:

1. An automatic shift control device mounted on a vehicle provided with an engine, comprising:

a friction clutch;

a dog clutch gearbox which has a plurality of first gears each having engaging projections, and a plurality of second gears each having engaging recesses engageable with the engaging projections, the gear box being configured to achieve a gear change when the engaging projections of a first gear are engaged with any engaging recesses of a second gear;

an automatic shift device with at least one electric actuator, the automatic shift device being configured to engage and disengage the friction clutch and to perform a gear change in the dog clutch gearbox; and a control unit configured to control the actuator to shift a clutch position of the friction clutch to a clutch position on the disengaged side from a first clutch position, the first clutch position corresponding to a maximum state of partial engagement of the friction clutch which allows the vehicle to remain stopped with the engine idling, and engages the friction clutch after a gear change;

wherein the control unit is configured to shift the clutch position of the friction clutch to a second clutch position at which the friction clutch is in a mechanical maximum disengaged state when the vehicle is stopped and when the dog clutch gearbox is in a gear-in state and the engine is being driven, and configured to perform a control to maintain a state in which the clutch position of the friction clutch is at a clutch position between the first clutch position and the second clutch position at the time of a shift change while the vehicle is moving forward.

2. The automatic shift control device according to claim 1, wherein the control unit is configured such that it does not shift the clutch position of the friction clutch up to the second clutch position at the time of a shift change while the vehicle is moving forward.

3. The automatic shift control device according to claim 1, wherein the control unit is configured to hold the clutch position of the friction clutch at a specific position between the first clutch position and the second clutch position for a prescribed period of time at the time of a shift change while the vehicle is moving forward.

4. The automatic shift control device according to claim 1, wherein the control unit is configured to perform an operation to shift the clutch position of the friction clutch first to the engaged side and then to the disengaged side within a range between the first clutch position and the second clutch position at the time of a shift change while the vehicle is moving forward.

5. The automatic shift control device according to claim 1, wherein the control unit is configured to change a rate at which the friction clutch is engaged or disengaged at the time of a shift change while the vehicle is moving forward.

6. The automatic shift control device according to claim 1, further comprising a gear position sensor configured to detect a gear position in the dog clutch gearbox, wherein the control unit is configured to detect an engaged state in which the engaging projections are engaged with the engaging recesses based on the gear position sensor and to engage the friction clutch when a dog abutment state changes to an engaged state at the time of a shift change while the vehicle is moving forward.

7. The automatic shift control device according to claim 1, wherein the control unit is configured to store a preset specific period of time as a period of time for which a dog abutment state changes to an engaged state, and to engage the friction clutch when the specific period of time elapses at the time of a shift change while the vehicle is moving forward.

8. The automatic shift control device according to claim 1, in combination with a vehicle.

9. The automatic shift control device according to claim 1, wherein the friction clutch comprises friction plates and clutch plates, and wherein the first clutch position corresponds to a lower limit of a distance between the friction plates and the clutch plates when the vehicle is stopped with the engine idling.

10. A vehicle, comprising:
a friction clutch;
a dog clutch gearbox which has a plurality of first gears each having engaging projections, and a plurality of second gears each having engaging recesses engageable with the engaging projections, the dog clutch gearbox being configured to achieve a gear change when the engaging projections of at least one first gear are engaged with any engaging recesses of at least one second gear;
an electric actuator;
a shift shaft rotated by power of the actuator;
a clutch transmitting mechanism configured to engage and disengage the friction clutch in synchronization with the rotation of the shift shaft; and
a gearbox transmitting mechanism configured to perform a gear change in the dog clutch gearbox in synchronization with the rotation of the shift shaft,
wherein, at the time of a shift change, the gearbox transmitting mechanism is driven to perform a gear change in the dog clutch gearbox after the actuator has been driven to rotate the shift shaft, and the clutch transmitting mechanism has been driven to shift the clutch position of the friction clutch to a clutch position on a disengaged side from a first clutch position, the first clutch position corresponding to a maximum state of partial engagement of the friction clutch which allows the vehicle to remain stopped with the engine idling, and then the clutch transmitting mechanism is driven to engage the friction clutch;
wherein the clutch position of the friction clutch is maintained at a clutch position between the first clutch and a second clutch position at which the friction clutch is in a mechanical maximum disengaged state at the time of a shift change while the vehicle is moving forward.

11. The vehicle according to claim 10, wherein the clutch transmitting mechanism is a ball cam mechanism for converting the rotating movement of the shift shaft into reciprocating movement to engage and disengage the clutch, having a first cam plate having a first cam groove and rotatable together with the shift shaft, a second cam plate having a second cam groove and arranged opposed to the first cam plate, and a ball interposed between the first and second cam grooves and held between the first and second cam plates, and wherein the clutch position of the friction clutch reaches a clutch position between the first clutch position and the second clutch position when the distance between the first cam plate and the second cam plate becomes maximum.

* * * * *